April 21, 1959  A. L. THURSTON  2,883,504
LINEAR WEIGHING CELL
Filed Feb. 19, 1957  3 Sheets-Sheet 1

INVENTOR.
ARTHUR L. THURSTON.
BY
ATTORNEYS.

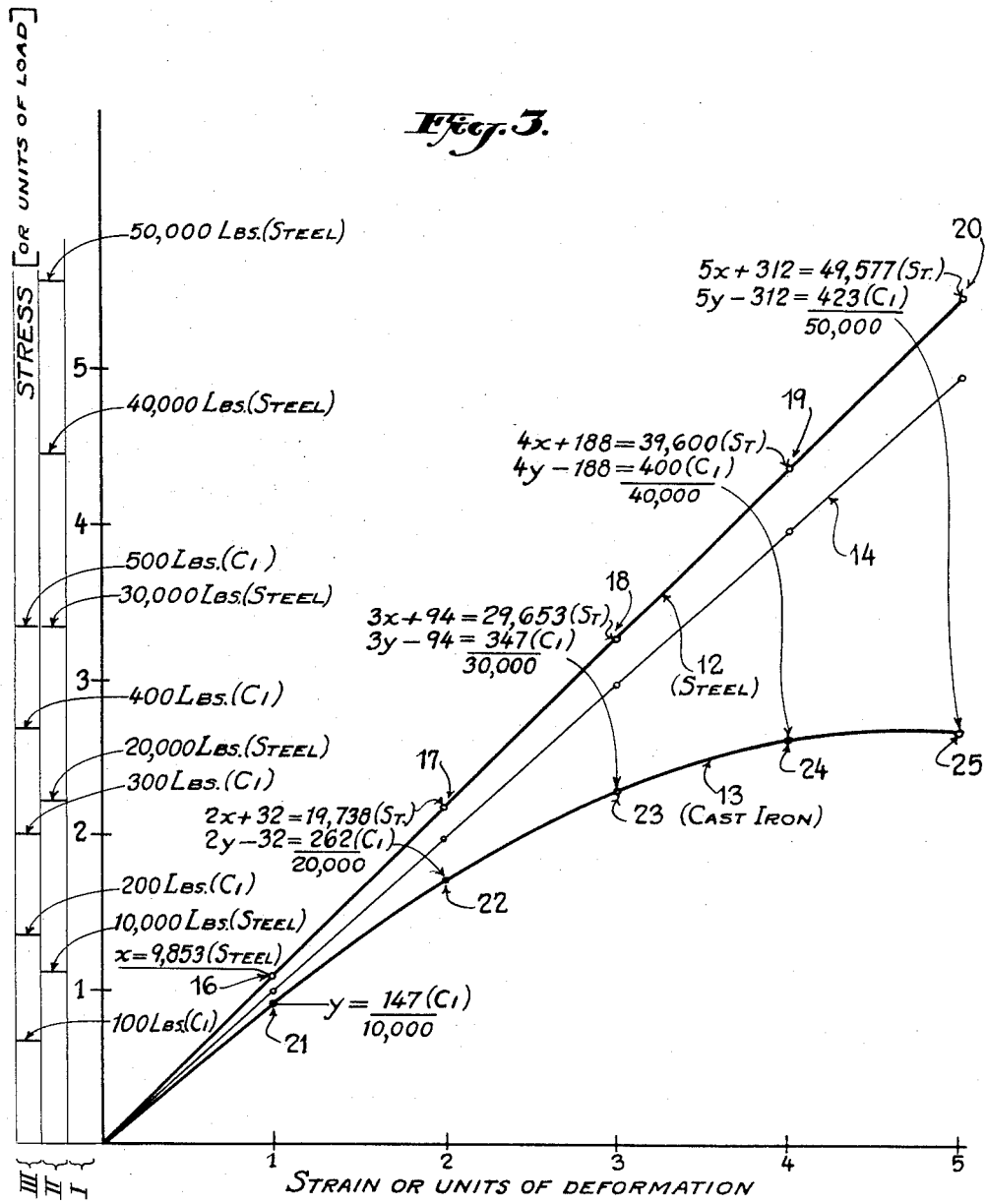

April 21, 1959 — A. L. THURSTON — 2,883,504
LINEAR WEIGHING CELL
Filed Feb. 19, 1957 — 3 Sheets-Sheet 3

INVENTOR.
ARTHUR L. THURSTON.
BY
Ward Neal Haselton Orme & McClhannon
ATTORNEYS.

United States Patent Office 2,883,504
Patented Apr. 21, 1959

2,883,504

LINEAR WEIGHING CELL

Arthur L. Thurston, Cheshire, Conn., assignor to Revere Corporation of America, Wallingford, Conn., a corporation of New Jersey Application February 19, 1957, Serial No. 641,179

10 Claims. (Cl. 201—63)

This invention relates to apparatus for measuring compression forces, such apparatus being particularly adapted for use as a weighing apparatus, among other possible uses.

The invention also relates to a weighing cell which is capable of converting a force such as one produced by a weight into a variable electrical parameter, such as electrical voltage, which is proportional to the force acting thereon and such as described, by way of example, in Patent No. 2,488,349.

In one of its presently preferred forms the invention may be embodied in a cell or capsule-like device which can be inserted between a suitable support and an object to be weighed.

It is known that where the strain or deformation of a member is used as a measurement of the force applied to the member such strain or deformation does not vary in an exact linear manner with such applied force but rather produces a force-deformation line having a small curvature, that is, for equal increments of force the increments of deformation are not equal. When a single cell of this type is employed for measuring a compressive force or weight, it is possible to compensate for such curvature of the cell deformation or strain by constructing the indicating instrument means to produce a like curvature thereby to indicate or record the force in such a manner that the output of the instrument means varies as a linear function of the force applied to such cell, that is, equal increments of force produce equal increments of indicated deformation. However, a compressive force cannot always be properly measured by such a single cell. For example, a platform of a platform type scale normally requires support by several cells. When the compressive forces acting upon several cells are totalized, such as under the weighbridge of such a platform, the distribution of the load on individual cells will vary depending upon where the object being weighed is placed on the platform or depending on the center of gravity of the load. The indicating instrument means can be adjusted to read correctly if the object is placed in such a location on the platform that all of the cells are loaded equally, for example, if the load is placed in the center of the platform and the weighing cells are equally distributed about the axis of the load. However, if the load or object to be weighed is placed in such a manner that the cells are loaded unequally, for example, if it is placed on the end or corner of a platform having weighing cells under its peripheral corners, the indicated weight will be in error due to the fact that the individual cells, due to their unequal loading, are compelled to operate at different points of their curvature. This can be avoided by making all of the cells operate with linearity by means comprising the present invention.

The invention in a preferred form thereof is constituted by an apparatus for measuring compression forces comprising a force-carrying member which is constituted by two or more submembers of differing materials, such sub-members coacting, when subjected to compression forces, in such a manner that the strain or deformation of one or more thereof varies in an exactly linear manner with the applied force. For example, the force carrying member in one form of the invention consists of two submembers of differing and supplementry stress-strain characteristics proportioned to cause the strain of one of such submembers to vary in a linear manner with variations in the sum or total forces applied to both.

Instead of measuring a force, such as weight of a body, the apparatus comprising the invention can be employed for measuring automatically any physical quantity which can be converted to a variable electrical parameter. The term "physical quantity" above mentioned includes within its purview such quantities as force, speed, acceleration, motion, and temperature.

Various further and more specific objects, features and advantages of the invention will clearly appear from the detailed description given below taken in connection with the accompanying drawings which form a part of this specification and illustrate, by way of example, certain forms of the invention. The invention consists in such novel features and combinations of parts as may be shown and described in connection with the apparatus herein disclosed.

In the drawings:

Fig. 1 comprises a graphical representation of the load-deformation curve of a steel column undergoing compression forces below its elastic limit;

Fig. 2 comprises a graphical representation of load-deformation curve of a column of cast iron;

Fig. 3 shows on a common system of coordinates a graphical representation of stress (load) vs. deformation of a steel column of selected cross-sectional area, and also a graphical representation of load vs. deformation of a cast iron column which is to be employed therewith for purposes of compensating for the curvature in the first-mentioned graphical representation;

Figure 1:
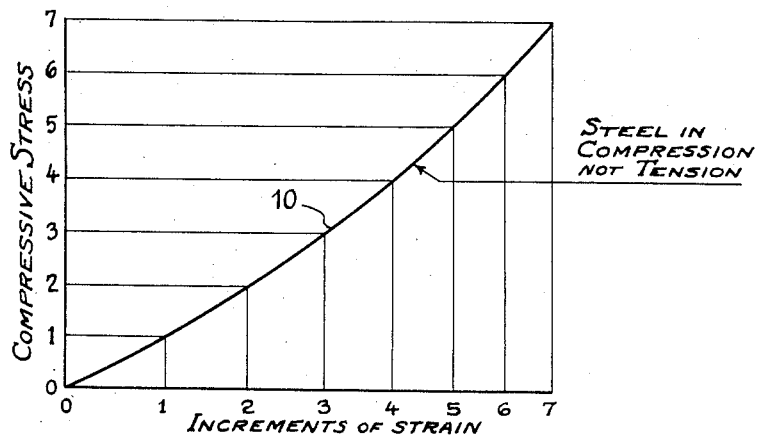

Referring to the drawings in greater detail with particular reference to Fig. 1, the latter by curve 10 indicates that a steel column subjected to compression below its elastic limit does not exactly follow Hooke's law which is to the effect that in an elastic body under any kind of stress within its elastic limit the stress is proportional to strain, viz, stress divided by strain is a constant. In fact, referring again to such steel column, for equal increments of load or applied compressive force the deformation or strain decreases as the load increases to produce such curve. It is noted that this refers to steel in compression and not in tension. Conversely, selected unequal increments of load or applied force are capable of producing equal increments of deformation, such unequal increments progressively getting larger in a selected manner to be discussed more fully hereinafter.

The load-deformation curve 10 in Fig. 1 indicates a bowing or convexity directed downwardly.

Figure 2:
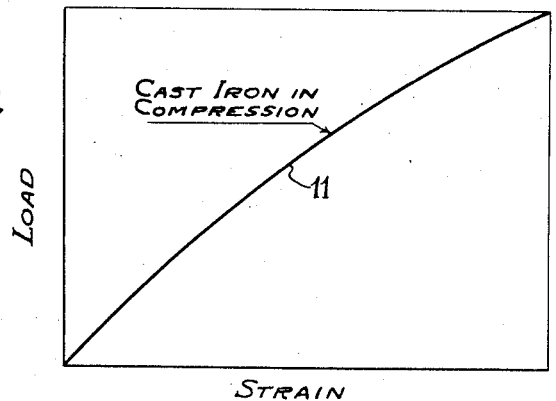

On the other hand, different material, such as cast iron, copper and brass, have load-deformation curves, the curvatures of which are in the opposite direction, as indicated by the curve 11 for cast iron in Fig. 2. That is, the application of successive equal increments of load or compressive force produces progressively increasing increments of deformation or strain.

Conversely concerning Fig. 2, the application to cast iron of a succession of selected unequal increments of load or compressive force can produce equal increments of strain or deformation, such selected unequal increments progressively becoming smaller in a selected manner, also as will be set forth in greater detail below.

It should be borne in mind that steel is known to be an elastic material and thus when stressed below its elastic limit and the load removed, it will almost immediately return to its original dimensions. On the other hand, cast iron, copper, brass and certain other materials are known as plastic materials in that they have no definite elastic limit. However, many materials so designated as plastic have an elastic memory, cast iron being one of these, and will, after being stressed and the stress removed, return to their original dimensions although not as quickly as the so-called elastic materials.

As aforementioned, steel under tension produces a load-deformation curve which is opposite to that when under compression. The present invention applies only to members which undergo compression forces.

It is, of course, understood that the physical properties of cast iron and brass vary substantially with variations in their compositions. Also the physical properties of copper varies with the amount of cold working to which it has been subjected.

In employing two or more different materials, such as steel and cast iron, in the force carrying members in such a manner to make the deformation of one or more of the members exactly linear with applied force, I have found it desirable to select differing materials the linear coefficients of expansion of which are as nearly equal as possible. Steel and cast iron are such materials.

A method for determining the construction of a weighing cell in accordance with the present invention will now be set forth. As aforementioned the first factor to be determined is the upper limit of weight which it is desired to be supported upon the weighing cell. If for example, 50,000 lbs. is selected as the upper limit, then it is clear that the weighing cell embodying the present invention should produce equal units of deformation with the application of equal increments of such load. For example, the application of increments of load of 10,000 lbs. in numbers from 1 to 5 should provide five equal increments or units of deformation. However, as above mentioned (Fig. 1), the application of a series of equal increments of load to a steel column fails to produce equal increments of deformation, the latter increments progressively growing smaller as the load increases. However, in order to achieve the aim of equal increments of deformation by applying compressive loads to steel alone, the increments of such compressive loads must be unequal and must progressively grow larger. In other words, the application of a succession of selected unequal increments of load to a steel column can provide equal increments of deformation, provided such unequal increments of load progressively grow larger in a selected manner.

Hence if we attach a resistance wire strain gauge to such column of steel for the purpose of measuring the deformation thereof and if we select as our first unequal load increment a load which is somewhat less than the first increment of linear load, we can establish a first point upon the linear graphical representation of load vs. deformation. The amount of load required to be borne by some other material in order to make up the difference will determine a second increment as set forth below.

From an actual test of a weighing cell comprising a steel column of 1 square inch cross-sectional area and having a 50,000 lb. capacity, I have found the unequal increments of load that are necessary to be applied thereto to attain equal increments of deformation are as set forth in the table below. The table also indicates the amount of load which must be carried by the other material, in this case cast iron, for the purpose of providing equal increments of load input, that is, to make the load input linear:

*Case I*

| Load Carried By Steel | plus | Load Carried By Cast Iron | = | Load Input |
| --- | --- | --- | --- | --- |
| 0      |  | 0   |  | 0      |
| 9,853  |  | 147 |  | 10,000 |
| 19,738 |  | 262 |  | 20,000 |
| 29,653 |  | 347 |  | 30,000 |
| 39,600 |  | 400 |  | 40,000 |
| 49,577 |  | 423 |  | 50,000 |

From the above it will be seen that the first unequal increment of load to be carried by the steel column is 9853 which is the basic increment upon which the succeeding ones are based.

An algebraic representation of such unequal increments of load to be carried by such steel column is as follows:

1st unequal increment of load: $9853 = X$
2nd unequal increment of load: $19738 = 2X + 32$
3rd unequal increment of load: $29653 = 3X + 94$
4th unequal increment of load: $39600 = 4X + 188$
5th unequal increment of load: $49577 = 5X + 312$ Analogously the basic increment of the load to be carried by the cast iron is 147 and an analogous algebraic representation of the unequal increments of load applied to the cast iron is as follows:

1st unequal increment of load: $147 = Y$
2nd unequal increment of load: $262 = 2Y - 32$
3rd unequal increment of load: $347 = 3Y - 94$
4th unequal increment of load: $400 = 4Y - 188$
5th unequal increment of load: $423 = 5Y - 312$ It is noted that the application of the successive unequal increments of load to the cast iron also produces equal units of deformation thereof.

Referring to Fig. 3, a graphical representation of the load-deformation curves of the aforementioned steel column and of the cast iron column to be employed therewith are shown wherein the curve for the steel is represented by the numeral 12 and that of the cast iron by 13.

A straight line 14 of Fig. 3 appears for the purposes of reference to indicate clearly the curvature of the other two lines.

The straight line 14, which provides the basis for the comparison of the lines 12 and 13, by way of example, is drafted at an angle of 45° wherein a first unit on the vertical scale corresponds with a first unit on the horizontal scale. The horizontal scale is graduated in increments or units of deformation whereas the vertical scale is graduated in units of load.

The curve 12 for steel (Fig. 3) indicates the progressively diminishing increments of deformation which occur as a result of the application of a series of equal increments of load referring to vertical scale 15.

The curve 13, on the other hand, illustrates the necessary load-deformation curve of a cast iron subelement which must be employed with the steel subelement (whose load-deformation curve is shown at 12) in order to make the load input linear.

Thus the curve 13 illustrates that as equal increments of load are applied to the cast iron element, the increments of deformation become progressively greater in the manner discussed above.

Referring now to the curve 12, it will be seen that the basic increment of load is indicated at X and in this illustration the example has a value of 9853 lbs. and is designated on such curve by the point 16. Such increment of load (X) produces the first increment of deformation.

The next point on the curve 12 which exists at the second increment of deformation is indicated by the point 17 and algebraically is indicated by the aforementioned expression $(2X + 32)$.

The points 18, 19 and 20 respectively are algebraically represented by the expressions set forth above in the table for the 3rd, 4th and 5th unequal increments of load and each point respectively is found upon the curve at the 3rd, 4th and 5th equal units of deformation.

It is understood that the curve 12 is drawn in exaggerated fashion for the purpose of illustrating the curvature thereof and does not fully correspond to a scale.

Thus the points on the curve 12 above mentioned, namely, points 16–20, inclusive, are obtained by unequal and progressively increasing increments of load illustrating that such increments are necessary to produce equal increments of deformation.

The curve 13 is analogously arrived at, the points 21–25, inclusive, representing the progressively diminishing increments of load to produce equal increments of deformation upon the cast iron subelement, such points 21–25, inclusive, corresponding to the 1st–5th, inclusive, points indicated in the table above set forth for cast iron.

A vertical load scale 26 (Fig. 3) wherein the basic increment is the aforementioned value X (9853 lbs.) is employed for representing the load upon the steel column of 1 square inch of cross-sectional area aforementioned.

In view of the fact that the basic increment upon the load scale 26 comprises the value 9853, by simple extrapolation a load scale in increments of 10,000 lbs. as shown is arrived at.

A vertical scale 27 is employed for indicating the increments of load for the curve 13 in accordance with the table above set forth for cast iron.

It is noted from the above tables of load carried by the steel and the cast iron that the load varies in a linear fashion, that is, the sum of the values of load resting upon both the steel and the cast iron varies in a linear manner.

Thus if we are aware of the characteristics of the steel subelement and the cast iron subelement which are employed to make up a weighing cell, it is possible to select the proportions of each to obtain a linear representation of deformation or strain as the load varies.

The curves of Fig. 3 are produced on the assumption that a strain gauge will give equal increments of output for equal increments of strain. However, this assumption is not exactly true. Nevertheless if the characteristic curves of both materials, such as the steel and cast iron (curves 12 and 13), are obtained by the use of resistance wire strain gauges, the effect of any error in the aforementioned assumption is eliminated. Thus the output of a strain gauge bridge is linear with load regardless of whether the strain is linear or not and this can be obtained with the proper selection of materials and cross-sectional areas.

Furthermore, if we make the same assumption above, namely, that a strain gauge will give equal increments of output for equal increments of strain, it is possible to control the characteristic curves of both the steel and the cast iron by selecting the cross-sectional areas of each. For example, if we diminish such area of the steel by 1%, it will result in a diminishing of the load carried by the steel in a corresponding percentage. The relative loads carried by the steel and by the cast iron are represented by the following table:

*Case II*

| Load Carried By Steel | plus | Load Carried by C. I. | = | Load Input |
|---|---|---|---|---|
| 9,755 | | 245 | | 10,000 |
| 19,541 | | 459 | | 20,000 |
| 29,357 | | 643 | | 30,000 |
| 39,204 | | 793 | | 40,000 |
| 49,081 | | 919 | | 50,000 |

Figure 4:
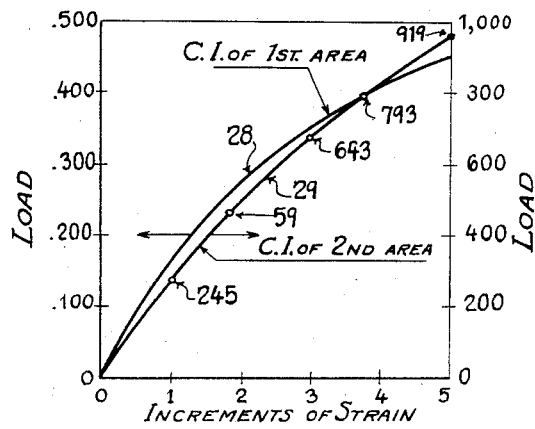
Fig. 4 is a further graphical representation of the load vs. deformation curves of two columns of cast iron of differing cross-sectional area.

The curvatures of the cast iron load-deformation curves for the cast iron in the first example and the second example cited above are well illustrated by the curves 28 and 29 of Fig. 4 indicating the ability to control the extent of curvature by selecting the cross-sectional area. The scale for curve 28 is shown on the lefthand margin of the curve of Fig. 4 whereas the scale for curve 29 is shown on the righthand margin of the curve, the latter being double the former.

The modulus of elasticity of cast iron varies within wide limits depending upon its composition, it being given by various authorities from eight million to twenty million. For purposes of illustration it is assumed herein that the modulus of elasticity of cast iron is ten million and that the modulus of elasticity of steel is thirty million. Based on these assumptions the stress in the cast iron will be one-third of that in the steel for equal deflections, and also based on this assumption the relative cross-sectional areas of the two subelements of cast iron and steel comprising the weighing cell in Case I above will be as follows (providing we assume further that a stress of 50,000 p.s.i. exists in the steel and of 16,665 p.s.i. exists in the cast iron):

$$\text{Steel } \frac{49577}{50000} = .9915 \text{ sq. in.}$$

$$\text{Cast iron } \frac{423}{16666} = .02583 \text{ sq. in.}$$

Figure 5:
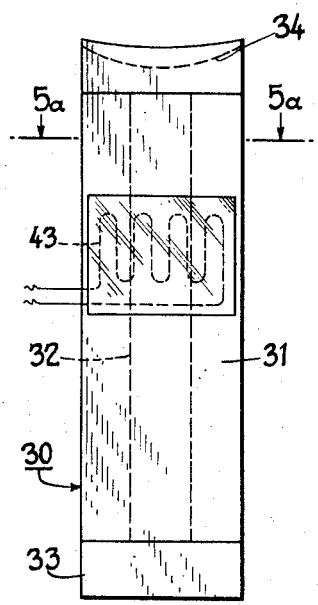
Fig. 5 is a side elevation of a weighing cell embodying the present invention.

A weighing cell 30 advantageously employing these relative areas is shown in Fig. 5 including a steel column 31 having a square periphery, and a cast iron column 32 of circular cross-section and inserted within the steel column in a round hole therein coaxially thereof, the cast iron being in slidable engagement with the steel.

The dimension of the cell 30 shown in Fig. 5 is calculated to be 1.01 in. on an edge and the diameter of the cross-section of the cast iron column therein is .18 in.

Employing the figures of Case II and under the similar assumptions, the areas are as follows:

$$\text{Steel } \frac{49081}{50000} = .98 \text{ sq. in.}$$

$$\text{Cast iron } \frac{991}{16666} = .055 \text{ sq. in.}$$

A weighing cell having the latter areas and constructed as shown in Fig. 5 with a steel column having a square periphery and a round cast iron column therein will have the following dimensions: The steel square will be 1.017 in. on an edge and the diameter of the steel column therein .265 in.

Spaced end members 33 and 34 are mounted at opposite extremities of the device and abut in precise flush face-to-face engagement with the adjacent areas of the columns 31 and 32.

Figure 6:
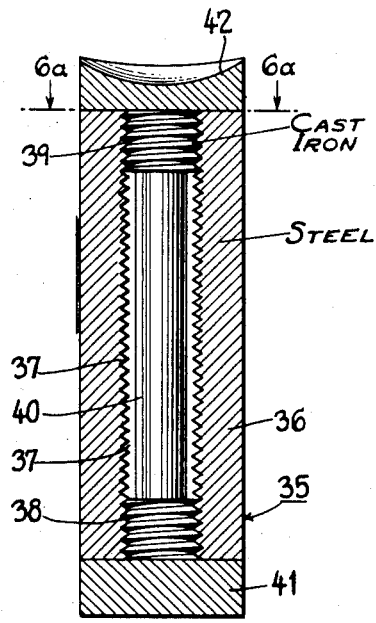
Fig. 6 is a vertical sectional view taken substantially along line 6—6 of Fig. 6a and showing a modification of the construction shown in Fig. 5.
Figure 5A:
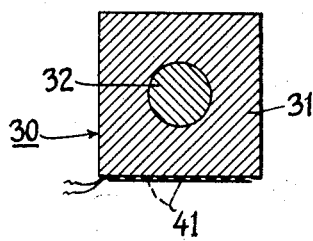
Fig. 5a is a transverse cross-sectional view of the device shown in Fig. 5.
Figure 6A:
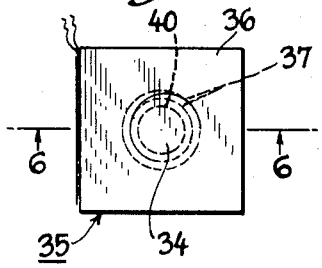
Fig. 6a is a transverse cross-sectional view of the device shown in Fig. 6 taken substantially along line 6a—6a of Fig. 6.

Referring to Figs. 6 and 6a, a column 35 is employed including a steel outer column 34 of square peripheral cross-sectional conformation having formed therein a coaxial passage 37 which may be internally threaded to receive respectively cast iron end plugs 38 and 39 which are secured into the opposite extremities of the passage so that the outer surfaces thereof are flush with the outer end surfaces of the steel column 36. The end plugs 38 and 39 are integral with a cast iron column 40 therebetween.

The diameter of the cast iron column 40 is somewhat less than that of the passage 37, there being a clearance between the internal surface of such passage and the outer surface of such column, such clearance extending throughout the length of the column.

The columns 36 and 40 preferably are interposed between spaced end members 41 and 42 which are analogous to end members 33, 34 of Fig. 5. The adjacent surfaces of each of such end members and of the abutting columns are in precise flush face-to-face engagement. Suitable means (not shown) may be employed for holding the spaced end members of both Figs. 5 and 6 in their desired positions relative to the columns interposed therebetween.

Resistance wire strain gauges of the types shown and described in the aforementioned U.S. Patent 2,488,349 may be employed with the cells shown in Figs. 5 and 6, one example thereof being designated at 43 in connection with the cell shown in Fig. 5, such strain gauge being connected in a well known manner to a suitable electrical input and output also in a manner as shown in such patent.

Referring to the above algebraic representations of increments of load to be carried by the steel column and by the cast iron column, it will be noted that the stress-strain characteristics of one of said columns is such that the strain thereof increases by equal increments in response to an increase in stress by unequal increments, the latter progressively increasing in size in a selected manner, and further that the material of the other column has stress-strain characteristics wherein the strain thereof increases by equal increments in response to an increase in stress also by unequal increments, the latter, however, progressively diminishing in size in a selected manner which is a function of the aforementioned increase in size of the increments of stress acting upon the other column. Thus the strain of one of said columns varies in a substantially linear manner with variations in the sum of the strains acting together upon said two columns. The size and proportions of the two columns are selected to achieve such result.

If desired, a plurality of weighing cells constructed in accordance with the present invention can be connected in electrical circuits not only as disclosed in such U.S. Patent 2,488,349 but also in U.S. Patent 2,678,206, or in any other suitable manner.

What is claimed is:

1. In apparatus for measuring compression forces comprising an assembly including two spaced end members and at least two columns interposed therebetween for receiving loads applied to said members in directions longitudinally of the columns, and strain gauge means mounted upon one of said columns, the material of one of said columns having stress-strain characteristics wherein the strain thereof increases by equal increments in response to an increase in stress by unequal increments, the latter progressively increasing in size in a selected manner, the material of the other column having stress-strain characteristics wherein the strain thereof increases by equal increments in response to an increase in stress also by unequal increments but which progressively diminish in size in a selected manner which is a function of the aforementioned increase in size of the increments of stress acting upon the other column, whereby the strain of one of said columns varies in a substantially linear manner with variations in the sum of the strains acting upon said two columns.

2. In apparatus for measuring compression forces comprising at least two force responsive members to which are jointly applied such compression forces, the strain of at least one of said members being employed as a measurement of the sum of the forces applied to such two members, said members being of differing and supplementary stress-strain characteristics and being proportioned and relatively disposed to distribute the forces acting thereupon, the sum of such forces varying in a linear manner with the strain of the aforementioned selected member.

3. In a weighing apparatus, an assembly comprising a supporting member, a plurality of columns each having one end surface abutting said member, and another member one surface of which abuts those surfaces at the other ends of said columns, an opposite surface of the latter member having an area for receiving the weight to be measured at a position so to distribute such weight to said columns that variations in the total of the resulting strains effected in the portions of said columns intermediate said members are selected functions of variations of such weight, the parts being stressed within their elastic limits, at least two of said columns being of differing and supplementary stress-strain characteristics to produce variations in strain in equal increments in response to variations in weight in equal increments comprising the sum of the loads acting upon such two columns of differing characteristics.

4. Apparatus for measuring forces comprising: an assembly including two spaced supporting members and a plurality of force carrying elements interposed therebetween for receiving loads applied to said supporting members, and electrical resistance type strain gauge means mounted upon at least one of said force carrying elements, the latter elements being of materials having preselected differing stress-strain characteristics, one of which is supplementary to the other, said force carrying elements being proportioned to distribute a total load thereupon, which total varies as a linear function of the deformation of said elements, the load acting upon one of said elements increasing by increments of selectively progressively increasing size to produce an increase in deformation by increments of equal size.

5. In apparatus for measuring compression forces comprising: an assembly including two spaced supporting members and a plurality of columns interposed therebetween with their end surfaces uniformly abutting said supporting members whereby such columns are stressed as selected functions of compression forces applied to said supporting members in directions longitudinally of the columns, at least two of said columns being of differing materials having differing stress-strain characteristics, one of said columns being of a material which as the load increases by equal increments, the deformation increases by increments of progressively diminishing size and conversely as the load applied thereto increases by unequal increments of selected progressively increasing size the deformation increases by increments of equal size, the differing material of the other column being of converse characteristics, that is, as the load applied thereto increases by increments of equal size the deformation increases by increments of progressively increasing size, the size of such latter increments increasing as a function of the increments of load of progressively increasing size which are necessary to be applied to the first-mentioned column for the purpose of increasing the deformation by equal increments, the sum of such increments of load applied to such two columns thus varying in a liner manner with deformation whereby the sum of the loads acting upon said two columns increases by equal increments with equal increments of deformation.

6. Apparatus for measuring compression forces comprising in combination a pair of columns of materials having differing stress-strain characteristics wherein stresses acting upon a first of such columns varies in a non-linear manner with strain produced thereby in accordance with a stress-strain graphical representation on a conventional coordinate system comprising a line having a predetermined curvature, the stress-strain graphical representation of the other column comprising a line having a curvature in the opposite direction, the linear coefficients of expansion of said materials being nearly equal.

7. In apparatus for measuring compression forces comprising: an assembly including two spaced supporting members and a plurality of columns interposed therebetween with their end surfaces uniformly abutting their supporting members whereby such columns are stressed as a function of compression forces applied to said members in directions longitudinally of the columns, at least two of said columns being of materials having differing stress-strain characteristics, such characteristics of one of such columns being graphically represented by a line having a curvature in one direction whereas such characteristics of such other column are graphically represented by a line having a curvature in an opposite direction, the sum of the stresses acting upon such columns of such differing characteristics varying in a linear manner with variation in strain of one of such columns.

8. In apparatus for measuring compression forces comprising: at least two different elements, the strains of which are employed as a measurement of the force applied thereto, such elements jointly resisting a force to be measured, such elements being of different materials, each producing a stress-strain curve of a curvature opposite to that of the other material, and means for sensing the strain of at least one of such elements.

9. In apparatus for measuring compression forces comprising: a force carrying member, the strain of which is employed as a measurement of the force applied thereto, said member consisting of at least two submembers of differing materials, the stress-strain curves of which materials are of opposite curvature.

10. Apparatus in accordance with claim 1 wherein said strain gauge means are of the resistance wire type as mounted upon one of said columns and wherein the stress-strain characteristics of both of said columns are determined by resistance wire strain gauge means.

References Cited in the file of this patent

UNITED STATES PATENTS

| | | |
|---|---|---|
| 2,458,481 | Ruge | Jan. 4, 1949 |
| 2,488,349 | Thurston | Nov. 15, 1949 |